United States Patent
Huggins et al.

(10) Patent No.: US 9,105,143 B1
(45) Date of Patent: Aug. 11, 2015

(54) PERSISTENT AUTHENTICATION

(75) Inventors: Margaret A. Huggins, Charlotte, NC (US); Douglas G. Brown, Waxhaw, NC (US); Marc L. Warshawsky, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 1606 days.

(21) Appl. No.: 12/413,932

(22) Filed: Mar. 30, 2009

(51) Int. Cl.
*H04M 11/00* (2006.01)
*G07F 7/08* (2006.01)

(52) U.S. Cl.
CPC .................................. *G07F 7/08* (2013.01)

(58) Field of Classification Search
CPC ............ G06Q 20/3674; G06Q 20/382; G06Q 20/4014; G06Q 20/02; G06Q 20/04; G06Q 20/341; G06Q 20/40; G06Q 30/06; G06Q 30/02; G06Q 20/10; G06Q 20/3829; G06Q 10/10; G06Q 20/027; G06Q 30/0601; G06Q 20/4012; G06Q 20/355; G06Q 20/401; H04M 3/533; H04M 3/42059; H04M 1/663; H04M 15/00; H04M 15/36; H04M 3/42; H04M 1/56; H04M 2242/22; G07F 7/08; G07F 17/0014; H04Q 3/00; H04Q 3/42; H04Q 3/0004
USPC ........ 379/91.1, 142.04, 142.05, 88.19–88.21, 379/91.01, 118, 121.06, 127.02, 127.06, 379/183, 207.13–207.15, 239, 245, 261, 379/280, 288
See application file for complete search history.

(56) References Cited

U.S. PATENT DOCUMENTS

| | | | |
|---|---|---|---|
| 6,396,919 B1 * | 5/2002 | Shimada et al. | 379/265.12 |
| 2001/0005682 A1 * | 6/2001 | Terao et al. | 455/550 |
| 2002/0057775 A1 * | 5/2002 | Shimada et al. | 379/111 |
| 2003/0174822 A1 * | 9/2003 | Moon et al. | 379/114.15 |
| 2005/0038744 A1 * | 2/2005 | Viijoen | 705/42 |
| 2006/0153171 A1 * | 7/2006 | Sakai | 370/352 |
| 2007/0127451 A1 * | 6/2007 | Jung et al. | 370/356 |
| 2007/0250920 A1 * | 10/2007 | Lindsay | 726/7 |
| 2008/0285756 A1 * | 11/2008 | Chuprov et al. | 380/277 |
| 2009/0313681 A1 * | 12/2009 | Kim et al. | 726/4 |
| 2010/0099382 A1 * | 4/2010 | Ishiguro et al. | 455/411 |
| 2010/0107225 A1 * | 4/2010 | Spencer et al. | 726/4 |

* cited by examiner

*Primary Examiner* — Akelaw Teshale
(74) *Attorney, Agent, or Firm* — Banner & Witcoff, Ltd.; Michael A. Springs (57) ABSTRACT

Techniques for supporting a mobile financial service that enables a customers to enroll the customer's mobile phone number and register accounts are disclosed. A persistent authentication request is received from a customer, and the customer is authenticated based on authentication information provided by the customer. The customer enters a device identification of the communication device so that the device identification is registered and linked to the customer's profile. When the customer requests non-actionable information (e.g., account balance and transaction history information) by calling a customer service center with a registered communication device, the calling identification is provided to the customer service center by the incoming call. The customer service determines whether the calling identification corresponds to a registered number. If so, the customer service center provides the requested non-actionable information to the communication device without further authentication.

18 Claims, 7 Drawing Sheets

PERSISTENT AUTHENTICATION

FIELD OF THE INVENTION

Aspects of the invention generally relate to mobile banking. More specifically, aspects relate to providing non-actionable information to the customer based on a registered identification of a communication device.

BACKGROUND

With traditional systems, when a customer calls the bank to retrieve a balance, the customer is typically required to authenticate herself/herself by providing a personal credential, e.g., a phone channel ID or a social security number and/or account number. If the customer requests the balance in subsequent requests, the customer is required to authenticate every time they call the bank. As a result, the customer may have a less customer-friendly experience.

Traditional systems often experience a number of deficiencies. For example, a customer service representative may rely on verbal authentication for customers who choose not to establish telephone credentials, thus placing a greater burden on the banking staff and increasing sustained volume on the banking resource. The customer consequently has a longer time to obtain an account balance. Often, the customer must share private information, e.g., the customer's social security number, for every balance inquiry and must remember a lengthy account number.

BRIEF SUMMARY

Aspects of the invention address one or more of the issues mentioned above by disclosing methods, computer readable media, and apparatuses for supporting a mobile financial service that enables a customers to enroll the customer's mobile phone number and register accounts through different channels associated with an ATM, in person, call center, IVR, and online. When the customer calls a bank phone number, the customer's device is immediately authenticated with the mobile number. Consequently, balance information may be automatically provided through a voice channel as audible information with a direct connection to balance information.

According to another aspect of the invention, a persistent authentication request from a customer is received, and the customer is authenticated based on authentication information provided by the customer. The customer enters a device identification of the communication device so that the device identification is registered and linked to the customer's profile. When the customer requests non-actionable information by calling a customer service center with a registered communication device, the calling identification is provided to the customer service center by the incoming call. In order to verify that the communication device is registered, the customer service determines whether the calling identification corresponds to a registered number. If so, the customer service center provides the requested non-actionable information to the communication device without further authentication.

With another aspect of the invention, if non-actionable information cannot be provided to a registered communication device within a predetermined duration, a callback will be subsequently established to the registered communication device so that the requested non-actionable information can be provided to the customer.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
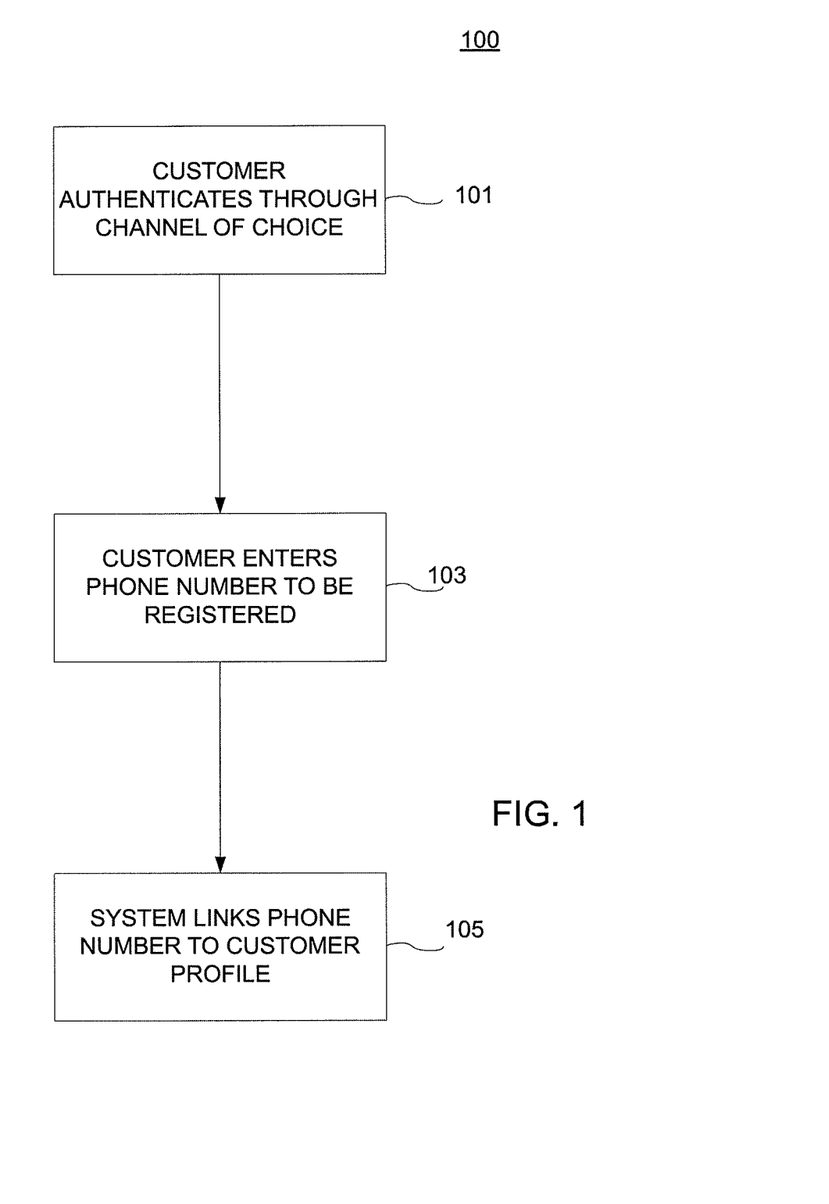
FIG. 1 shows a flow diagram for registering a telephone number in accordance with an aspect of the invention.

FIG. 1 shows flow diagram 100 for registering a telephone number (device identification) of a communication device in accordance with an aspect of the invention. It is estimated that 80% of IVR calls and 20% of associate-assisted calls are for balance or transaction history information. With aspects of the invention, an enhanced customer experience is supported with respect to traditional systems while reducing sustained load on the banking infrastructure for these call types. Moreover, average handling time for automated inquiries is typically reduced while some associate assisted calls may be avoided altogether. With other aspects of the invention, authentication for every customer interaction is removed by creating a link between the customer's communication device and account profile.

Figure 2:
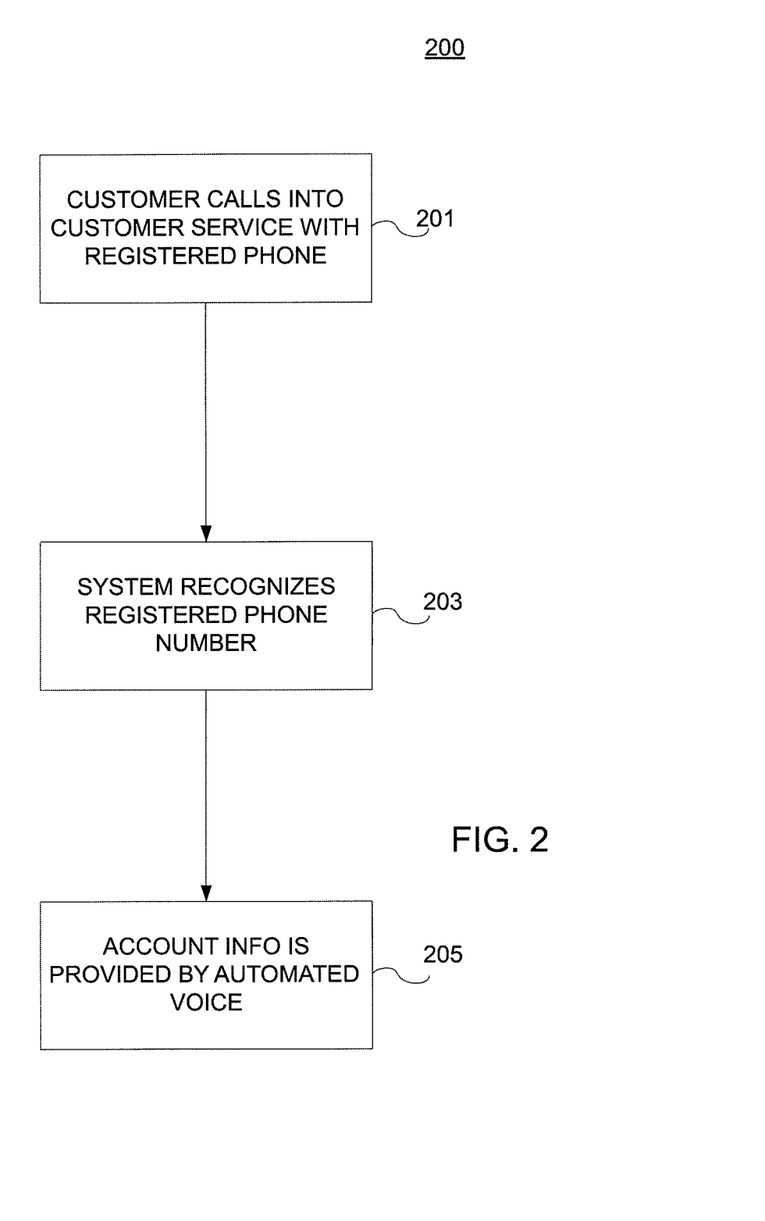
FIG. 2 shows a flow diagram for obtaining balance information or transaction history information in accordance with an aspect of the invention.

Processes 100 and 200 (as shown in FIG. 2) provide a mobile financial service that enables a customers to enroll the customer's mobile phone number and register accounts (through any channel ATM, in person, call center, IVR, online) so that when the customer calls a bank phone number, the customer's device is immediately authenticated with the mobile number. Consequently, balance information is automatically provided through a voice channel as audible information with a direct connection to balance information.

With embodiments of the invention, other non-actionable information may be provided, including transaction history information. Non-actionable information typically corresponds to status information and does not enable to execute any action on the account.

The communication device may assume different forms, including mobile phones, personal digital assistants (PDAs), and landline telephones, in which the communication device has a device identification (e.g., a telephone number).

Figure 3:
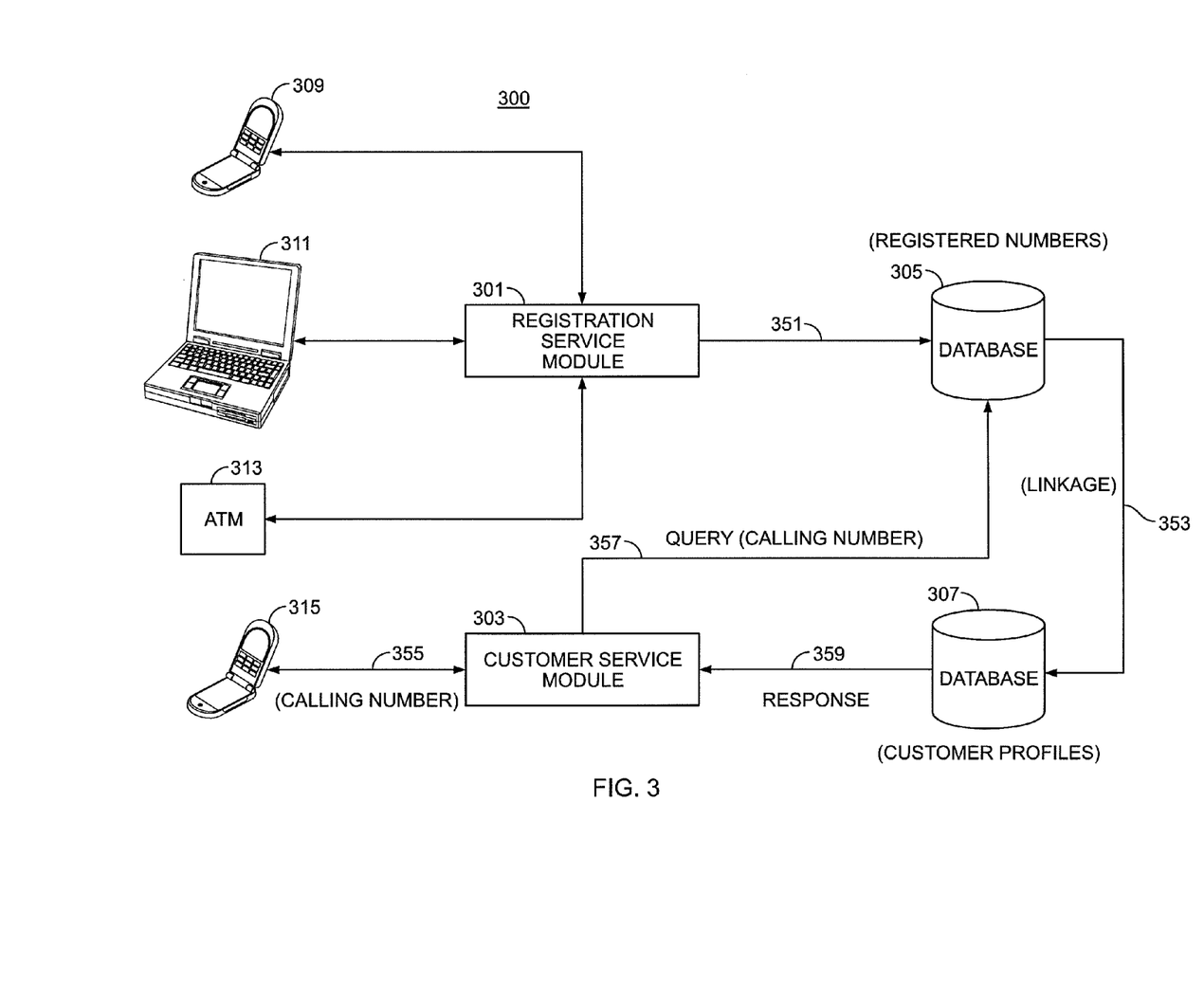
FIG. 3 shows a block diagram of a system in accordance with an aspect of the invention.

In step 101, the customer calls a registration system (e.g., registration system 301 as shown in FIG. 3) through a channel of choice. Different channels may be supported including a wireless or wireline telephone channel (e.g., using interactive response (IVR)), Internet channel, or automated teller machine (ATM) channel. The customer may be authenticated by entering telephone credentials (e.g., social security number, account number, personal identification number (PIN), and/or password).

In step 103, the customer enters the device identification (e.g., telephone number) of the communication device to be registered. However, other embodiments may require that the customer actually register the communication device by communicating through the communication device so that only the calling identification (telephone number) contained in the registration request is registered.

Once the customer has been authenticated and has provided a device identification, the customer profile is linked to the device identification in step 105.

FIG. 2 shows flow diagram 200 for obtaining balance information or transaction history information in accordance with an aspect of the invention. With subsequent calls using a communication device, which has a registered device identification, the customer is no longer required to further authenticate in order to retrieve basic balance or transaction history information.

In step 201, the customer calls customer service with the registered communication device by calling a designated bank telephone number (e.g., 800 number or direct dial phone number). The incoming call provides the calling identification (calling number) of the calling party. Thus, if the communication device is registered, the calling identification is the corresponding registered number of the communication device and is recognized as such in step 203. In step 205, the banking system retrieves the requested non-actionable information (e.g., account balance) associated with the customer's profile and converts the information into synthesized voice so that the non-actionable information can be presented to the customer. However, the non-actionable information may be presented in other formats (e.g., text).

FIG. 3 shows a block diagram of system 300 that executes processes 100 and 200 in accordance with an aspect of the invention. According to aspects of the invention, system 300 reduces the demands on the banking IVR/telephone resources because of the reduced handling time per inquiry while increasing customer satisfaction with less wait time and streamlined experience.

Figure 7:
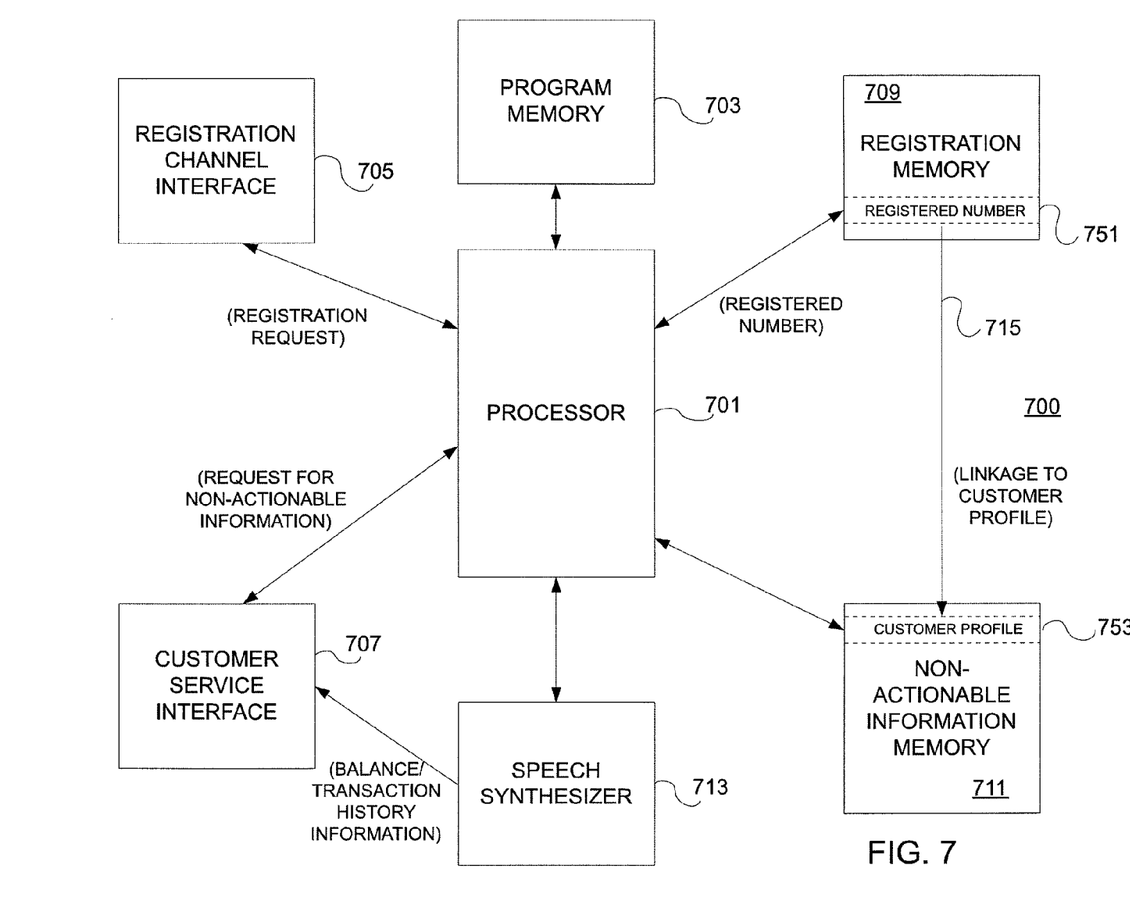
FIG. 7 shows an apparatus for supporting persistent authentication in accordance with an aspect of the invention.

System 300 comprises registration service module 301, which supports process 100, and customer service module 303, which supports process 200. While registration service 301 and customer service module 303 are shown as separate modules, modules 301 and 303 may be implemented on different computing platforms or on a common computing platform, e.g., apparatus 700 as shown in FIG. 7.

Registration service module 301 may support a plurality of communications channels so that different types of communication devices (e.g., mobile phone 309, personal computer 311, and ATM 313) can be supported. When registration service module 301 receives a registration request, the customer is authenticated by authentication information provided by the customer. When the customer has been authenticated, the customer enters the device identification to be registered. Registration service module 301 provides registered device identification 351 to database 305. Registered device identification 351 is then linked to the corresponding customer profile in database 307 through linkage 353. While FIG. 3 shows separate databases 305 and 307, embodiments of the invention support a common memory device that supports databases 305 and 307, where linkage 353 comprises a pointer from registered device identification 351 to the customer profile.

Once a communication device is registered, the customer may subsequently request non-actionable information (e.g., account balances and the transaction history) by establishing a call to customer service module 303 and communication device 315. When customer service module 303 receives the incoming call, customer service module 303 obtains the calling identification corresponding to the device identification of communication device 315. In order to verify that the device identification is registered, customer service module 303 sends query 357 with calling identification 355. Response 359 is returned by databases 305 and 307 indicating whether communication device is registered. If so, response 359 includes the requested non-actionable information. Customer service module consequently provides the requested non-actionable information to communication device 315.

Figure 4:
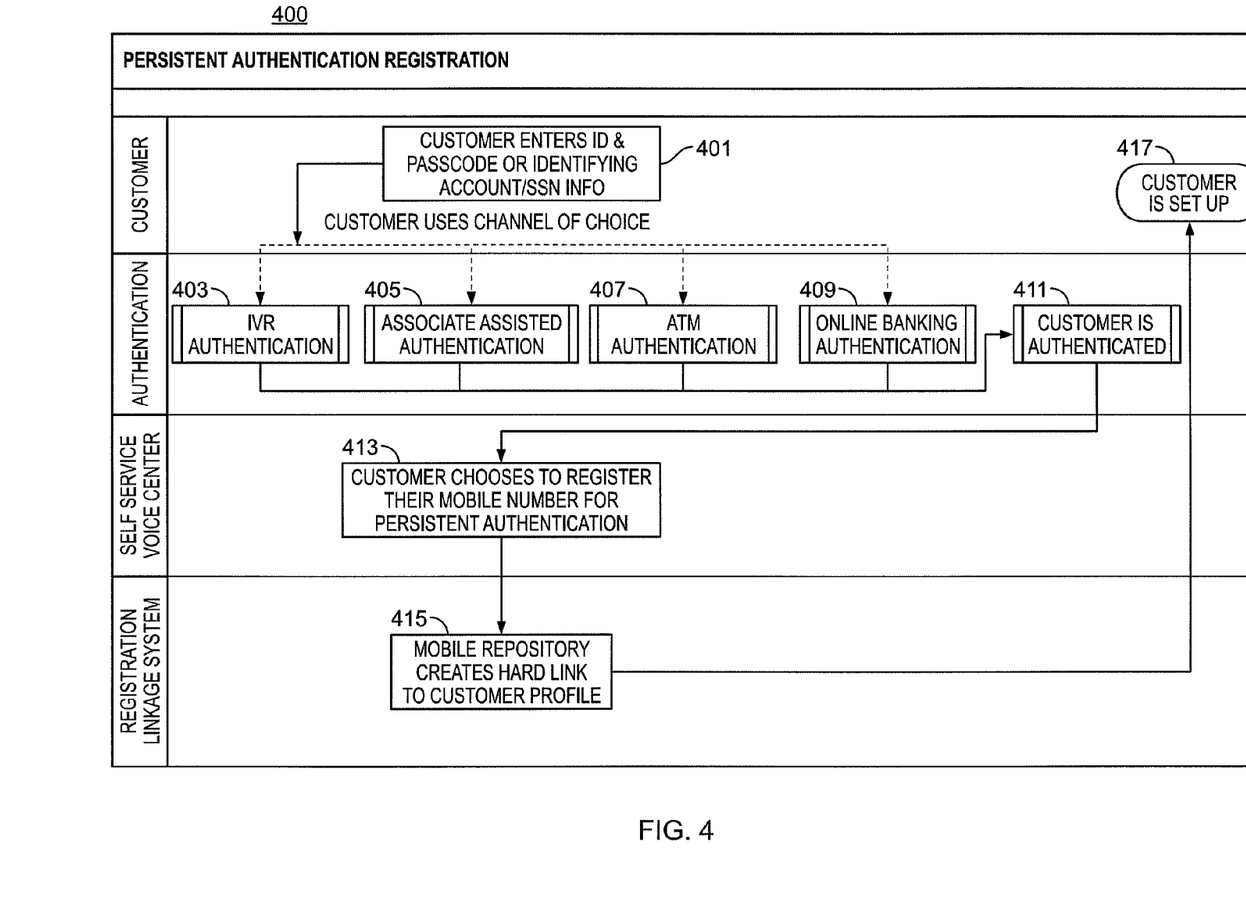
FIG. 4 shows a process supporting persistent authentication registration in accordance with an aspect of the invention.

FIG. 4 shows process 400 supporting persistent authentication registration in accordance with an aspect of the invention. In step 401, a customer (e.g., through mobile telephone 309, personal computer 311, or ATM 313) requests registration of a communication device. The customer is authenticated, for example, with an ID and password or with an account number and social security number. Authentication is performed by one of different ways (corresponding to steps 403, 405, 407, or 409). For example, the customer may be authenticated by interactive voice recognition (step 403) or by a person (step 405) or by another interactive format based on the channel of choice.

When the customer has been authenticated in step 411, the customer provides a communication device identification (e.g., mobile number) that is to be registered in step 413. In step 417, a link (e.g., linkage 353 as shown in FIG. 3) is created from the registered device identification to the customer profile of the customer. Registration process 400 is completed in step 417 so that the customer can retrieve non-actionable information in a subsequent call as shown in FIG. 5.

Figure 5:
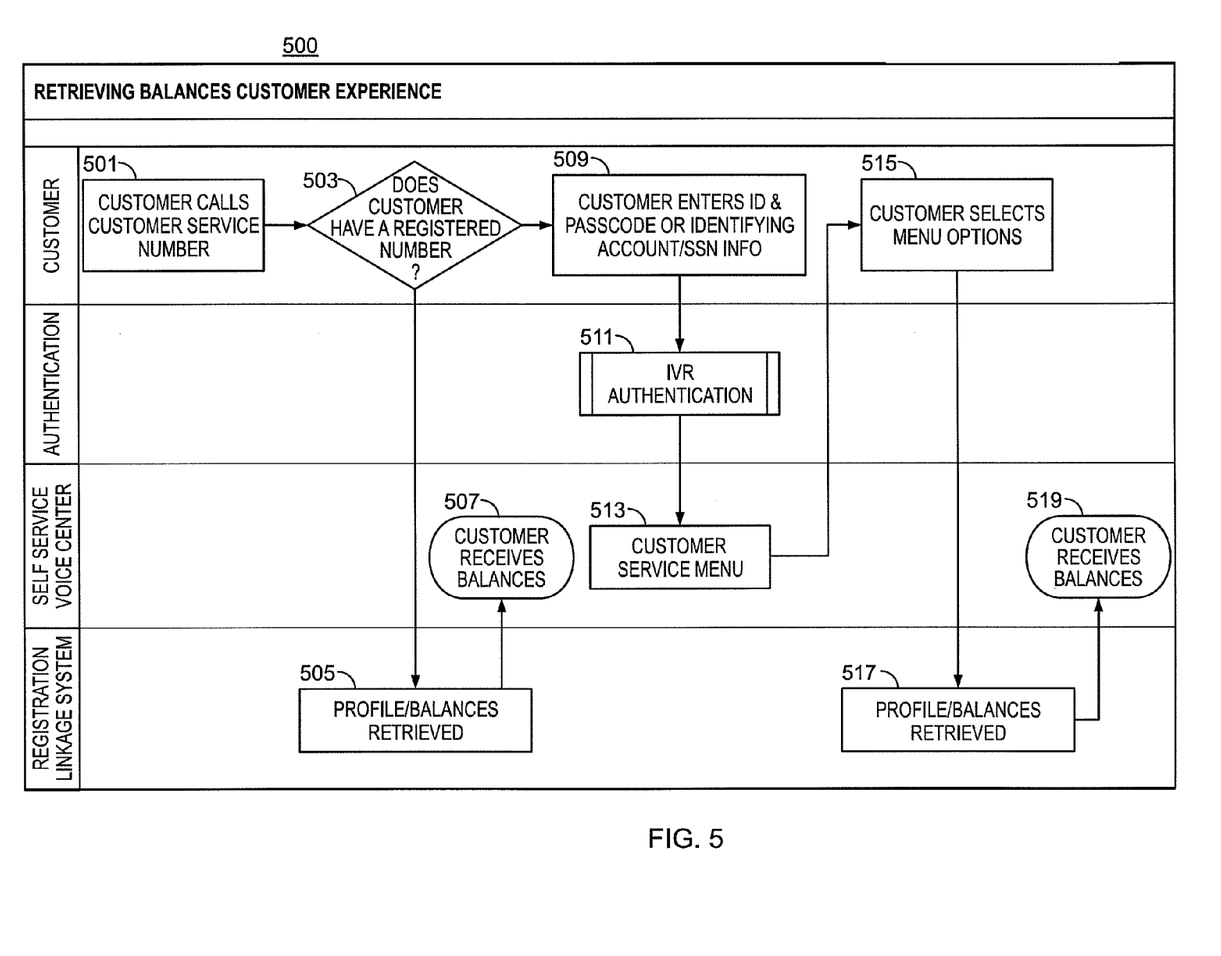
FIG. 5 shows a process for retrieving account balances in accordance with an aspect of the invention.

FIG. 5 shows process 500 for retrieving account balances in accordance with an aspect of the invention. In step 501, a customer calls into a customer center to obtain requested non-actionable information (e.g., an account balance). Based on the calling identification as provided in the incoming call, step 503 determines if the communication device is registered. If not, steps 509, 511, 513, 515, 517, and 519 are performed to provide non-actionable information by authenticating the non-registered customer based on an entered ID and password or identifying account number and social security number. However, if the device communication device is registered, then the non-actionable information is automatically retrieved as identified by the linkage from the registered number to the customer profile in step 505. The requested non-actionable information is presented to the customer in step 507. For example, the non-actionable information is presented over the phone channel by converting the non-actionable information into voice or into text if the communication device is text-capable.

Figure 6:
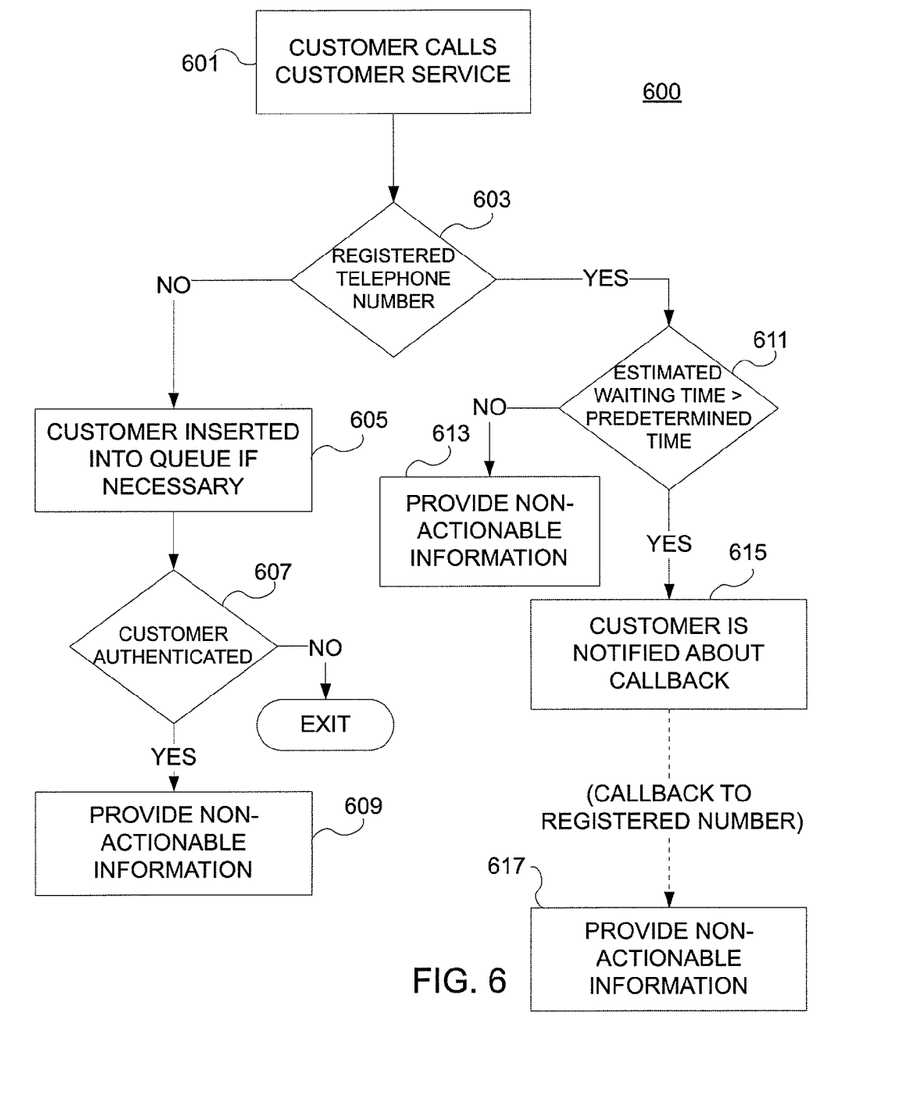
FIG. 6 shows a flow diagram for automatic callback with persistent authentication in accordance with an aspect of the invention.

FIG. 6 shows process 600 for automatic callback with persistent authentication in accordance with an aspect of the invention. Process 600 incorporates the features of processes 400 and 500, as shown in FIGS. 4 and 5 respectively. In addition, process 600 supports callback to a registered customer if an estimated wait time exceeds a predetermined duration. Process 700 may be used for any servicing environment (e.g., banking or governmental) where non-actionable information is requested through a registered communication device or where authentication is required to retrieve non-actionable information.

In step 601, a customer calls into a customer service center (e.g., customer service module 303 as shown in FIG. 3). (While the customer service center supports providing non-actionable information, the customer service center may also provide other services that are not explicitly shown.) Based on the device identification provided in the incoming call, step 603 determines whether the communication device (through which the customer is making the call) is registered. If not, the customer is authenticated in step 607. In such a case, the customer provides personal information (e.g., account number and social security number) to ascertain that the customer is a valid customer. Depending on the loading on the customer service center, the incoming calling may be placed in a queue in step 605 before the customer can be authenticated. Once the customer is authenticated, requested non-actionable information is provided in step 609.

However, if step 603 determines that the calling device identification is registered, step 611 determines whether an estimated wait time for the registered customer exceeds a predetermined duration. If not, the requested non-actionable information is provided to the customer within the predetermined time duration. Otherwise, the customer is formed so that a callback will occur in order to provide the requested non-actionable information. When the customer service center is able to provide the non-actionable information for the customer, a callback is initiated to the registered device identification in which the non-actionable information is provided in step 617.

FIG. 7 shows apparatus 700 for supporting persistent authentication in accordance with an aspect of the invention. Processor 701 may execute computer executable instructions from a computer-readable medium, for example, memory 703 in order perform a persistent authentication process (any or all of the processes described herein). Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 701. The executable instructions may carry out any or all of the method steps described herein.

While apparatus 700 shows one processor (processor 700), embodiments of the invention may utilize a plurality of processors, in which the functionalities of executed persistent authentication processes are partitioned among the plurality of processors.

Processor 701 receives registration request from a customer through registration channel interface 705, which may support a plurality of communication channels (e.g., a wireless channel from mobile phone 309, Internet connection with personal computer 311, and ATM 313 as shown in FIG. 3) over a channel of choice. Processor 701 performs authentication of the customer and registers device identification 751 in memory 709. Device identification 751 is linked to customer profile 753 in memory 711 by linkage 715. Linkage 715 may assume one of different forms, including a pointer in memory that points from device identification 751 to customer profile 753 or a signal in which memory 709 informs memory 711 that device identification 751 is linked to customer profile 753.

With embodiments of the invention, memories 703, 709, and 711 may be implemented with different memory devices or with a common memory device.

Processor 701 also receives a request for non-actionable information (associated with customer profile 753) through customer service interface 707. Consequently, processor 701 obtains the calling device identification that is contained in the incoming call. Processor 701 then queries memory 709 to determine whether the calling device identification is registered. If so, processor 701 obtains the requested non-actionable information if the calling device identification is registered.

The non-actionable information may be presented to the customer in different forms. For example, the non-actionable information may be provided in text form or as voice by converting a text format to a voice format through speech synthesizer 713.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. A computer-assisted method comprising:
   receiving, by a processor through a communications interface, a persistent authentication request from a first communication device of a first customer;
   authenticating, by the processor, the first customer based on authentication information provided by the first customer;
   registering, by the processor, the first communication device with a device identification, wherein the registering includes linking the device identification to non-actionable information that is associated with the first communication device;
   receiving, by the processor through the communications interface, during a call that is initiated subsequent to the authenticating and the registering, a first subsequent request from the first customer for the non-actionable information, wherein the first subsequent request is generated through the first communication device and contains a first calling identification;
   verifying, by the processor, that the first communication device is registered based on the first calling identification during the call without user authentication;
   when the first communication device is verified as being registered, sending, by the processor through the communications interface, the non-actionable information to the first communication device without further authentication; and
   when the first communication device is verified as being registered and a second subsequent request is for action on an account for the first customer, requiring, by the processor, the further authentication to execute the action on the account.

2. The method of claim 1, wherein the non-actionable information comprises balance information of an account for the first customer.

3. The method of claim 1, wherein the non-actionable information comprises transaction history information of an account for the first customer.

4. The method of claim 1, wherein the sending comprises:
if the non-actionable information cannot be provided within a predetermined time duration, initiating a callback to the registered communication device; and
providing the non-actionable information when the callback has been established.

5. The method of claim 1, further comprising:
receiving a second subsequent request from a second communication device of a second customer, the second subsequent request containing a second calling identification;
if the second calling identification is not registered, authenticating the second customer; and
if the second customer has been authenticated, providing non-actionable information to the second communication device for the second customer.

6. The method of claim 1, further comprising:
receiving a second subsequent request from a second customer, the second subsequent request containing a second calling identification; and
if the second calling identification is registered, providing non-actionable information for the second customer without further verification.

7. The method of claim 1, further comprising:
receiving, subsequent to the authenticating and the registering, another subsequent request from the first customer for action on an account, wherein the other subsequent request is generated through the first communication device and contains the first calling identification; and
repeating the authenticating before executing the action on the account.

8. An apparatus comprising:
a memory; and
a processor coupled to the memory and configured to perform, based on instructions stored in the memory:
receiving a persistent authentication request from a first customer;
authenticating the first customer based on authentication information provided by the first customer;
registering a communication device with a device identification, wherein the registering includes linking the device identification to non-actionable information that is associated with the communication device;
receiving, during a call that is initiated subsequent to the authenticating and the registering, a first subsequent request from the first customer for non-actionable information, wherein the first subsequent request is generated through the communication device and contains a first calling identification;
verifying that the communication device is registered based on the first calling identification during the call without user authentication;
when the non-actionable information cannot be provided within a predetermined time duration, initiating a callback to the registered communication device;
providing the non-actionable information when the callback has been established; and
when the communication device is verified as being registered and a second subsequent request is for action on an account for the first customer, requiring, by the processor, the further authentication to execute the action on the account.

9. The apparatus of claim 8, further comprising:
a registration interface that is configured to interact with a plurality of communication channels; and
wherein the processor is further configured to perform:
receiving the persistent authentication request through a channel of choice from the first customer, the channel of choice being one of the plurality of communication channels.

10. The apparatus of claim 8, wherein the processor is further configured to perform:
linking the device identification to the non-actionable information that is associated with the first customer.

11. The apparatus of claim 8, wherein the processor is further configured to perform:
if the non-actionable information can be provided within the predetermined time duration, providing the non-actionable information without further authentication.

12. The apparatus of claim 8, wherein the processor is further configured to perform:
receiving a second subsequent request from a second customer, the second subsequent request containing a second calling identification;
if the second calling identification is not registered, authenticating the second customer; and
if the second customer has been authenticated, providing non-actionable information for the second customer.

13. The apparatus of claim 8, wherein the processor is further configured to perform:
receiving a second subsequent request from a second customer, the second subsequent request containing a second calling identification; and
if the second calling identification is registered, providing non-actionable information for the second customer without further verification.

14. A non-transitory computer-readable storage medium storing computer-executable instructions that, when executed, cause a processor to perform:
receiving a persistent authentication request from a first customer;
authenticating the first customer based on authentication information provided by the first customer;
registering a communication device with a device identification, wherein the registering includes linking the device identification to non-actionable information that is associated with the communication device;
receiving, during a call that is initiated subsequent to the authenticating and the registering, a first subsequent request for account information for an account of the first customer, wherein the first subsequent request is generated through the communication device and contains a first calling identification;
verifying that the communication device is registered based on the first calling identification during the call without user authentication;
when the communication device is verified as being registered, providing the account information without further authentication; and
when the communication device is verified as being registered and a second subsequent request is for action on an account for the first customer, requiring the further authentication to execute the action on the account.

15. The non-transitory computer-readable medium of claim 14, wherein the processor performs:
linking the device identification to the account information that is associated with the first customer.

16. The non-transitory computer-readable medium of claim 14, wherein the processor performs:
- if the account information cannot be provided within a predetermined time duration, initiating a callback to the registered communication device; and
- providing the account information when the callback has been established.

17. The non-transitory computer-readable medium of claim 14, wherein the processor performs:
- receiving a second subsequent request from a second customer, the second subsequent request containing a second calling identification;
- if the second calling identification is not registered, authenticating the second customer; and
- if the second customer has been authenticated, providing account information for the second customer.

18. The non-transitory computer-readable medium of claim 14, wherein the processor performs:
- receiving a second subsequent request from a second customer, the second subsequent request containing a second calling identification; and
- if the second calling identification is registered, providing account information for the second customer without further verification.

* * * * *